3,010,794
CARBON BLACK PROCESS
George F. Friauf and Brian Thorley, Pampa, Tex., assignors to Cabot Corporation, Boston, Mass., a corporation of Delaware
No Drawing. Filed Aug. 19, 1958, Ser. No. 755,880
20 Claims. (Cl. 23—209.4)

This invention relates to the production of carbon black and is concerned specifically with modifications and improvements in the basic process for forming carbon black by means of the thermal decomposition or cracking of hydrocarbon materials.

Although commercial carbon blacks are all derived from the thermal decomposition of carbon containing materials which are essentially hydrocarbon in nature, a wide range of carbon black products has been characterized already and the number of different grades and qualities recognized in the industry is continually increasing. The differences in grades and types of carbon black are due in part to manipulative differences in the processes for carrying out the thermal decomposition reactions of the starting hydrocarbon raw material, in part to differences in character of the various hydrocarbon raw materials used and in part to variations in the chemical and physical conditions under which the said decomposition reactions are conducted.

No matter which of the various available manipulative methods for producing carbon black is used, i.e. for example whether open flame decomposition (impingement or channel), enclosed direct flame decomposition (furnace), stored heat decomposition (cyclical thermal furnace), externally heated surfaces (continuous thermal) or detonation or internal combustion processes (engine or energy utilizing systems), etc., there are always certain more or less inexactly controlled or controllable factors which tend to make the maintenance of quality control and/or standardization of properties in the various grades of carbon black major problems throughout the entire industry. Unavoidable and usually uncontrollable changes in the character of the hydrocarbon feed materials further aggravate these problems of quality control and standardization of grades. This is particularly true when the hydrocarbon feed materials comprise liquid fractions because all the readily available, economical liquid hydrocarbon fractions are chemically rather complex, consisting of many different types of molecular structures, the proportions of which may vary widely from one source to another or even between batches from a single source.

One of the major objectives of the present invention is to provide a new and improved process for adjusting and controlling the properties of carbon blacks to meet prescribed and predetermined requirements. Another very important objective is to provide a simple means of compensating for variations in hydrocarbon raw materials and other factors which would normally affect significantly the quality of the black which would otherwise be produced unless extensive and continuous changes and alterations in the furnace equipment or operating conditions were made.

Still another objective is to provide a process for making blacks which can be pelletized more readily. Still another objective is to provide a process of producing carbon blacks which cause less heat generation during processing as well as in the finished rubber article after vulcanization.

Still other objectives and advantages of the present invention will become apparent from the complete description and explanation of the invention which follow.

We have now discovered a simple yet very effective process for controlling and adjusting the properties and characteristics of carbon blacks made by the thermal decomposition of a hydrocarbon raw material. In accordance with our process the carbon black properties can be selectively adjusted and/or the effect of changes in other variables of the process can be compensated for by introducing into the reaction zone in which the black is being formed relatively minor amounts of an alkali metal having an atomic number of at least 19. Said alkali metals are, of course, members of group 1A of the periodic system of chemical elements and they include potassium (atomic No. 19), rubidium (atomic No. 37), cesium (atomic No. 55) and francium (atomic No. 87).

The exact amount of the said alkali metal elements used in accordance with the teachings of the present invention will, of course, depend upon which one(s) are used as well as the particular nature of the carbon forming reaction involved and the exact properties of the product black on which control is most critical and the degree of adjustment desired in said properties. Although measurable effects can often be detected at lower concentrations, for most practical applications significant effects can be achieved by introducing said elements into the carbon forming reaction zone at a rate of at least about $10^{-6}$ times the rate by weight at which the carbon black is being formed therein. The best balance of black properties, and the most useful results therefore, will usually be achieved when said elements are introduced in amounts ranging between about 10 and about 1000 parts by weight per million parts by weight of carbon black produced. However, in some cases the maximum effects on certain properties will not be reached until still higher concentrations of said elements are introduced and in any case advantageous results can still be generally obtained when said elements are used in amounts greater than 1000 p.p.m. by weight on the black formed. Therefore, the maximum rate at which said chemical elements can be used with advantage in the carbon forming reaction will usually depend upon the amount of extraneous material that can be tolerated in the finished carbon black product. From this point of view the maximum rate of introduction of said elements would never be restricted below about 10,000 p.p.m. (representing about 1%) by weight of the black and in most cases even greater rates of introduction will be permissible, if desired, since we have found that extraneous matter retained on the finished black product usually runs no more than half as much the proportion by weight of the said chemical element added.

In any case, the amounts of said alkali metal elements introduced as specified above may consist entirely of a single element or of two or more or of any combination of these elements. Likewise, these alkali metal elements are effective when added to the carbon forming reaction in any form whatsoever, whether in elemental form or in chemical combination; whether in solid, liquid or vapor state; and whether dissolved or suspended in a carrier such as water, aqueous media, organic media, including the hydrocarbon raw materials from which the black is being made, or suspended in vapors or gases such as the combustion air or the fuel gases which are often burned in contact with the make hydrocarbon in order to supply the heat necessary for the thermal decomposition of said hydrocarbon to form carbon black. Generally speaking, such elements can be handled most easily and conveniently in the form of their chemical compounds because the compounds are readily available and simplify the problem of supplying the elements themselves in uniform concentration. For example, suitable compounds containing said elements may be either inorganic such as their chlorides, sulfates, carbonates, etc., or metallo-organic such as their salts with organic acids, including the fatty acids, their metal alkyls, etc.

In view of the relatively low concentrations at which such elements are effective, it is usually most advantageous to introduce them in a highly diluted or extended form since the maintenance of a uniform rate of addition and level of concentration is greatly facilitated thereby. Thus, it is often desirable to introduce them in the form of a very dilute aqueous solution of their water soluble compounds or in an analogous dilute organic solution or aqueous emulsions. Nor is it necessary in obtaining such solutions to start with a pure or chemically refined compound or element.

The following specific examples of particular embodiments of this invention are given only for the purpose of providing a fuller and more complete understanding of some of the operating details of the invention and methods of practicing same. These examples should be considered illustrative only and not in any sense limitative on the scope of the present invention.

EXAMPLE 1

In a three-furnace carbon black production unit operating with a liquid hydrocarbon make stream injected axially and a combustible mixture of natural gas and air injected tangentially into each furnace, the black produced from a furfural extract from a recycle stock obtained from a petroleum refinery cracking unit was characterized by modulus values when compounded in rubber consistently above the range specified for the grade in question. The values obtained were 115 to 120% of the control standard whereas a range of 95 to 105% of standard was desired.

Without change in any of the equipment or other conditions of operation, the introduction into the reaction zone of the furnace of a dilute aqueous solution of potassium chloride in an amount sufficient to provide potassium to the carbon black producing reaction at a rate of 22.5 parts per million parts by weight of black formed immediately reduced the modulus properties of the resulting black to a level well within specifications without causing the other properties of the black to deviate from a satisfactory level or appreciably affecting black yields. Furthermore, the black produced with KCl added was very much more readily converted to pellets by means of a dry pelletizing process in a rotating drum than that made previous to the KCl addition.

The conditions of operation in the above runs were as follows:

Liquid make feed properties:
  Specific gravity, 60° F./60° F. _____ 1.091
  Viscosity at 130° F., SSU _____ 229
  Viscosity at 210° F., SSU _____ 52
  Asphaltenes content, percent _____ 0.36
  Ash content, percent _____ 0.038
  Sulfur content, percent _____ 0.83
  H/C ratio _____ 1.084
  Av. molecular weight _____ 245
  Initial boiling point (ASTM) _____ ° F__ 489
  50% distilled boiling point _____ ° F__ 713
Furnace operating conditions:
  Liquid make feed rate _____ gals./hr__ 255
  Temp. of liquid make feed _____ ° F__ 250
  Natural gas feed rate _____ c.f./hr__ 9,700
  Combustion air feed rate _____ c.f./hr__ 160,000
  Axial air (for atomization, etc.) __ c./f.hr__ [1]14,000
  Carbon black production rate _____ lbs./hr__ 1,275

[1] Of which 8,500 c.f./hr. was used in atomization.

The same results were consistently obtained whether the KCl solution was injected into the reaction zone separately or in the stream of residual make oil, the natural gas feed to the furnace or the combustion air stream.

Substantially equivalent results can be obtained in the above example if, instead of supplying potassium salts to the reaction zones of the production unit, a dilute solution of salts of either cesium or rubidium is supplied to any reaction zone in sufficient amount to provide about 10 parts of rubidium or about 20 parts of cesium per million parts by weight of carbon black being produced in the combined reaction zones of the entire unit.

On the other hand, the introduction of salts of sodium in the above example in quantities sufficient to supply 20 parts of sodium per million parts by weight of carbon black produced provided no perceivable improvement in properties of the resultant carbon black.

Whereas Example 1 above illustrates the use of this invention as a simple way to make quality adjustments or compensate for changeable factors which would otherwise require relatively difficult adjustments in equipment or process operating conditions, the following example demonstrates how major shifts in carbon black character can also be achieved without major change in equipment or operating conditions through the practice of the present invention.

EXAMPLE 2

A carbon black furnace was operating on about 60 gallons per hour of residual tar recovered from a cycle stock in a petroleum refinery cracking operation. This make liquid was preheated to 500° F. and introduced axially into the cylindrical reaction zone of the furnace through an air atomization nozzle located at the center of the upstream end of said furnace. The atomized make liquid was thermally decomposed with the aid of a turbulent combustion reaction maintained by six jets of natural gas equally spaced around the atomization nozzle and a stream of air entering the annular space surrounding the gas jets through a spiral scroll at the same end of the furnace.

Operating in this way in said furnace having a short cylindrical section about 18" in diameter and 9" long followed by a second short constricted cylindrical section about 9" in diameter and 9" long and using a total of about 3000 cu. ft./hr. of natural gas and 55,300 cu. ft./hr. of air, a standard high structure type furnace black was produced at a rate of about 220 lbs./hr.

Without any change whatsoever in furnace configuration, parts, collection system, etc., or in type of make liquid hydrocarbon, fuel, etc., and with no other change in operating conditions except the introduction into the make hydrocarbon stream after the preheater and before it entered the air atomization nozzle of 1.5 gallons per hour of a dilute aqueous solution of KCl containing 0.029 lb. KCl per gallon, the nature of the black produced was changed dramatically as the comparison of analytical and rubber properties in the table below demonstrates, although the carbon black production rate remained substantially unchanged at 220 lbs./hr. In this run, therefore, the rate of addition of K was 104 parts by weight per million parts of black formed.

*Comparison of blacks*

| Black sample | Analytical properties | | | | Rubber properties [1] | | |
|---|---|---|---|---|---|---|---|
| | Nig. scale | Tint strength | Surf. area m.²/gm. | Oil absorpt. cc./gm. | Tensile strength percent of std. | 300% modulus percent of std. | Rebound percent of std. |
| Control | 87.0 | 228 | 114 | 1.68 | 96 | 118 | 99.1 |
| With KCl | 86.6 | 243 | 97 | 0.98 | 98 | 71 | 96.6 |

[1] Tested at 50 part loading in SBR-1,000 polymer using standard recipe and curing cycle.

Clearly the black made in the presence of potassium is quite different in character from that made under the same conditions except in the absence of potassium additive. This new type of extremely low modulus black has been found to be very useful in many applications. For example, used at a given loading in a given polymer it produces a much softer stock, or, alternatively, used at much higher than normal loadings in order to produce a stock of given hardness from a given elastomer, it provides the desired qualities in a stock containing a smaller proportion of elastomer and having several other concomitant advantages.

The same results were obtained in the above example when a dilute solution of KOH containing an equivalent concentration of potassium per gallon was substituted for the KCl solution utilized above.

The same results were also obtained in the above example when the additive solutions in question were carried into the reaction zone suspended in one of the gaseous reactants instead of in the liquid make hydrocarbon.

Substantially equivalent results can be obtained in the above example by using instead of the potassium-containing additives a dilute solution of a salt of cesium in sufficient amount to supply 100 parts by weight Cs per $10^6$ parts black formed or a dilute solution of a salt of rubidium in sufficient amount to supply 50 parts by weight Rb per $10^6$ parts black formed.

EXAMPLE 3

In a twin generator thermal type carbon black furnace wherein the make hydrocarbon is exposed to cracking temperatures provided by the hot refractory surfaces in one generator while the other generator is being heated to cracking temperatures by burning off gases therein, natural gas diluted with reformed gas was used as the make hydrocarbon stream. Operating the unit at the natural gas concentration and flow rates required to maintain the surface area and tinting strength specified for "fine thermal grade" carbon black tended to produce black the modulus properties of which in rubber were higher than desired. For example the 400% modulus imparted to natural rubber by a 50 part loading of the said black in a standard recipe after a 45 minute cure averaged 1630 p.s.i.

Without change in any of the equipment or other conditions of operation of the unit, the injection into the natural gas stream entering the generator of KOH solution in an amount sufficient to provide potassium to the reaction zone at the rate of 0.0095 lb./hr. (about 8 parts K per million parts black) immediately reduced the 400% modulus rating of the resulting black in the above mentioned recipe to an average of about 1530 p.s.i. without causing the other properties of the black to fall below satisfactory levels. In fact, the black produced during the addition of the KCl solution actually possessed somewhat increased tinting strength and surface area and represented a slight increase in yield.

More complete data and results on the two above described sets of operating conditions are given in the table below.

of carbon black per thousand s.c.f. of natural gas even though natural gas flow rates were increased and reformed gas flow rates were reduced in order to prevent excessive increases in tinting strength and surface area of the black produced. These increases in natural gas flow rates without loss of yield (and in most cases some gain in yield) have led to very significant increases in production rate from a given unit, which is a tremendous economic advantage over and above the quality improvement advantages discussed previously.

Substantially the same results are obtained in the above described thermal unit using in place of KOH other potassium salts in dilute solution in amounts sufficient to supply the same relative quantities of potassium by weight as that supplied by the KOH in the above runs.

Similar improvements in quality of the black produced to those described in the above example are also obtained using similar proportions relative to the amount of hydrocarbon raw material supplied of the same additives in an impingement type carbon black producing apparatus operating on natural gas or oil enriched natural gas feed.

The examples described above illustrate several of the advantages of the present invention. For example, the blacks resulting from our improved process of manufacture are inherently easier to pelletize, thus permitting the production of improved quality pellets at increased rates in any given piece of pelletizing equipment. Furthermore, the rate at which a given hydrocarbon raw material can be decomposed to form the basic particles of carbon black in a given size and type of reactor can also be increased in many cases, thus permitting overall increase in production rate from a given plant.

The present invention can also be used to adjust critical properties and control important qualities of various types of carbon black as well. For example, it can be used to control rubber properties such as modulus, hardness etc. In fact blacks can be produced as illustrated by Example 2 above which have such dramatically modified rubber properties that much softer and more flexible stocks can be produced from a given elastomer at a given black loading, or, alternatively, much higher loadings of such black can be used with a given elastomer to produce stocks with a particular set of dynamic properties desired. Such characteristics are particularly desirable in some of the newer elastomers such as butyl rubber, the inherent elasticity of which is less than that of natural rubber. By providing these characteristics the blacks of this invention improve not only the general duty performance of such stocks but also produce improved abrasion resistance in such rubbers rendering them more useful for such uses as automobile tires where road wear is critical.

The present invention not only provides carbon blacks with improved rubber properties but also special blacks

| Make cycle flow rates | | Control additive | Black produced | | Black properties | | Natural rubber properties [1] | |
|---|---|---|---|---|---|---|---|---|
| Nat. gas, s.c.f.m. | Ref. gas, s.c.f.m. | | Rate, lbs./min. | Yield #/MCF nat. gas | Tint str. | Surf. area, sqm./gm. | 400% mod., p.s.i. | Tensile strength, p.s.i. |
| 1,292 | 2,130 | None | 18.7 | 14.5 | 57 | 10.1 | 1,630 | 3,350 |
| 1,292 | 2,130 | KOH | 20.4 | 15.8 | 65 | 10.6 | 1,530 | 3,290 |

[1] As measured with 45 min. cure of compound containing 50 parts by weight black per 100 parts rubber In further runs the amounts of potassium hydroxide solution were increased by from 2- to 32-fold with further reductions in 400% modulus in the standard natural rubber recipe to values from 1430 to 1230 p.s.i. while always maintaining tensile strengths in the same compounds of at least about 3200 p.s.i. Yields were also maintained generally at a level of about 15 to 16 lbs.

having dramatically improved properties for many other applications as well. For example, in fluid systems such as inks and paints, the use of the blacks of this invention permits the attainment of unique combinations of flow and coloring intensity at reduced cost. This is due to the fact that these blacks tend to have higher tinting strength and lower scale (lower scale means more intense light absorption and, therefore, jet blackness of appearance than conventional blacks of the same particle size and at the same time tend to absorb less liquid so that higher loadings can be used in a given liquid vehicle to make a product with a given viscosity and "flow" character. The same thing is true in pigmenting plastics and various protective coating systems.

Although as previously stated and as illustrated by the above examples, the present invention is effective and useful in any type of carbon black forming process based on the thermal decomposition of hydrocarbons, the results achieved by the use of the invention are perhaps most striking in those processes using normally liquid hydrocarbon fractions as carbon black raw material. This is probably due to the fact that blacks made from such liquid raw materials normally tend to impart higher modulus properties to rubbers. This is particularly true when these liquid hydrocarbon fractions are highly aromatic in nature such as the residual (i.e. not completely vaporizable without cracking) tars often used as carbon black raw materials today. Since the particular effects of the present invention are most noticeable when such liquid hydrocarbons are used as raw materials, they constitute the preferred feed stocks for use in the practice of the present invention.

While the exact mechanism by which the effects of the present invention are achieved is not clearly understood, we have proved that it is not simply a matter of introducing into the finished carbon black product extraneous materials which in themselves modify the properties of said product black. In fact we have found that the additive elements which we have used must be present at the initial moment of formation of the carbon black particles. For example if they are added even immediately following the carbon forming reaction zone, their effect is substantially nil.

We, therefore, conclude that the effects of the present invention must be due to a basic modification in the carbon forming reaction which is caused by the presence of the specified chemical elements in the reaction zone at the moment of decomposition of the hydrocarbon raw materials. Whatever the action of these elements, it must be largely chemical or physicochemical because it is not simply a matter of introducing any foreign molecule, element or other nuclei to the carbon-forming reaction zone as witness the tremendous number of other chemicals and additives, including lead compounds, copper, iron, barium, magnesium and many others, which have been tried in similar manner with no significant effect.

Having disclosed this invention together with preferred embodiments thereof what we claim and desire to secure by U.S. Letters Patent is:

1. In a process for making carbon black by the thermal decomposition in a high temperature, carbon forming reaction zone of fluid hydrocarbon raw material the improvement which comprises controlling the quality of the carbon black product obtained by continuously introducing at a controlled rate into said carbon forming reaction zone a substance comprising an alkali metal having an atomic number of at least 19 in amounts sufficient to provide at least 1 part by weight per million parts by weight of said alkali metal of carbon black produced, said proportion of alkali metal being directly related to the degree of quality adjustment needed in said black.

2. The improvement of claim 1 in which the alkali metal is potassium.

3. The improvement of claim 1 in which the alkali metal is rubidium.

4. The improvement of claim 1 in which the alkali metal is cesium.

5. In a process for making carbon black by the thermal decomposition of a fluid hydrocarbon flowing through an enclosed high temperature, carbon forming reaction zone the improvement which comprises controlling important rubber properties, including modulus, of the carbon black produced by continuously introducing at a controlled rate into said carbon forming reaction zone a substance comprising an alkali metal having an atomic number of at least 19 in amounts sufficient to provide at least 1 part by weight of said alkali metal per million parts by weight of carbon black produced, said proportion of alkali metal being directly related to the degree of adjustment needed in said rubber properties.

6. The improvement described in claim 5 in which the alkali metal is provided in amounts of not less than about 10 parts by weight per million parts of carbon black formed.

7. The improvement of claim 6, in which the alkali metal is potassium.

8. The improvement of claim 6 in which the alkali metal is rubidium.

9. The improvement of claim 6 in which the alkali metal is cesium.

10. In a process for producing carbon black from a fluid hydrocarbon by subjecting it to the thermal dissociation temperatures thereof the improvement which comprises intimately contacting and homogeneously admixing said hydrocarbon while it is being subjected to said dissociation temperatures with between about 10 and about 10,000 parts by weight of alkali metal chosen from the group consisting of potassium, rubidium, cesium and francium per million parts of carbon black being produced therefrom, said concentration of alkali metal being continuously maintained at a uniform level which is directly related to the degree of adjustment required in the properties of said black.

11. The improvement as described in claim 10 wherein the said hydrocarbon is heated to said dissociation temperatures by means of a combustion reaction conducted in direct contact with said hydrocarbon within an enclosed reaction zone.

12. The improvement as described in claim 10 wherein the said hydrocarbon is heated to said dissociation temperatures by means of radiation from hot refractory surfaces surrounding same.

13. The improvement as described in claim 10 wherein the said alkali metal is supplied in chemically combined form.

14. The improvement as described in claim 13 wherein the said alkali metal is supplied in the form of an impure material containing same.

15. The improvement as described in claim 10 wherein the said alkali metal is included in the hydrocarbon raw material used.

16. A process for making a modified furnace-type carbon black characterized by lower than normal modulus properties in rubbers, comprising introducing into a confined conversion space which is maintained at hydrocarbon cracking temperatures a fluid hydrocarbon and molecular oxygen containing gases in an amount regulated in proportion to the total supply of combustible reactants so as to maintain free carbon forming conditions in said conversion space and continuously delivering to said conversion space in such a manner as to contact said hydrocarbon intimately a substance comprising an alkali metal chosen from the group consisting of potassium, rubidium, cesium and francium in amounts sufficient to provide between about 10 and 1000 parts by weight of said alkali metal per million parts by weight of the carbon black being produced therein, the extent to which said modulus properties are lowered being directly related to the proportion of said alkali metal provided.

17. A process as described in claim 16 in which the fluid hydrocarbon comprises a substantial fraction of normally liquid components.

18. A process as described in claim 17 in which the normally liquid hydrocarbon fraction includes a substantial proportion of highly aromatic tars.

19. A process as described in claim 10 in which the alkali metal is supplied in chemically uncombined form.

20. The improvement as described in claim 10 wherein said alkali metal is supplied in the form of a dilute aqueous solution of a chemical compound containing said alkali metal.

References Cited in the file of this patent

UNITED STATES PATENTS

| | | |
|---|---|---|
| 1,438,032 | Frost | Dec. 5, 1922 |
| 2,632,713 | Krejci | Mar. 24, 1953 |
| 2,652,313 | Loving | Sept. 15, 1953 |
| 2,794,709 | Kirkbride | June 4, 1957 |
| 2,914,418 | Eastman | Nov. 24, 1959 |

FOREIGN PATENTS

| | | |
|---|---|---|
| 283,968 | Great Britain | Apr. 18, 1929 |

OTHER REFERENCES

Kalichevsky: Chemical Refining of Petroleum, pages 34, 35, Reinhold Publ. Corp., N.Y., 1942.

UNITED STATES PATENT OFFICE
CERTIFICATE OF CORRECTION

Patent No. 3,010,794                                November 28, 1961

George F. Friauf et al.

It is hereby certified that error appears in the above numbered patent requiring correction and that the said Letters Patent should read as corrected below.

Column 2, line 47, after "much" insert -- as --; column 7, line 63, strike out "of said alkali metal" and insert the same after "weight" in line 62, same column 7.

Signed and sealed this 15th day of January 1963.

(SEAL)
Attest:

ERNEST W. SWIDER                              DAVID L. LADD
Attesting Officer                                 Commissioner of Patents